United States Patent
Kurusu et al.

(12) United States Patent (10) Patent No.: US 6,269,918 B1
Kurusu et al. (45) Date of Patent: Aug. 7, 2001

(54) DAMPING FORCE CONTROL TYPE HYDRAULIC SHOCK ABSORBER

(75) Inventors: Akinori Kurusu, Kanagawa-ken; Takashi Nezu, Tokyo, both of (JP)

(73) Assignee: Tokico Ltd., Kanagawa-Ken (JP)

( * ) Notice: Subject to any disclaimer, the term of this patent is extended or adjusted under 35 U.S.C. 154(b) by 0 days.

(21) Appl. No.: 09/473,019

(22) Filed: Dec. 28, 1999

(30) Foreign Application Priority Data

Dec. 28, 1998 (JP) .................................................. 10-373068

(51) Int. Cl.[7] ...................................................... F16F 9/34
(52) U.S. Cl. .............................. 188/266.6; 188/322.13; 188/322.2
(58) Field of Search ........................... 188/322.13, 322.2, 188/322.19, 319.1, 318, 315, 266.6, 266.5, 266.1

(56) References Cited

U.S. PATENT DOCUMENTS

| | | | |
|---|---|---|---|
| 5,901,820 | * 5/1999 | Kashiwagi et al. | 188/266.6 |
| 5,934,421 | * 8/1999 | Nakadate et al. | 188/318 |
| 6,079,526 | * 6/2000 | Nezu et al. | 188/266.6 |
| 6,119,829 | * 9/2000 | Nakadate | 188/266.6 |

* cited by examiner

Primary Examiner—Robert J. Oberleitner
Assistant Examiner—Mariano Sy
(74) Attorney, Agent, or Firm—Wenderoth, Lind & Ponack, L.L.P.

(57) ABSTRACT

The flow of a hydraulic fluid caused by sliding movement of a piston in a cylinder is controlled by a disk valve and extension- and contraction-side main valves, thereby generating damping force. By controlling the valve opening pressures of the disk valve as a pressure control valve with respect to extension- and compression-side valve seats with a proportional solenoid actuator, damping force can be directly controlled independently of the piston speed. Moreover, the pressures in pilot chambers are changed to control the valve opening pressures of the extension- and compression-side main valves. Because the disk valve is placed between the extension- and compression-side valve seats, it is possible to simultaneously select different damping force characteristics for the extension and compression sides.

7 Claims, 5 Drawing Sheets

DAMPING FORCE CONTROL TYPE HYDRAULIC SHOCK ABSORBER

BACKGROUND OF THE INVENTION

The present invention relates to a damping force control type hydraulic shock absorber attached to a suspension system of a vehicle, for example, an automobile.

Hydraulic shock absorbers attached to suspension systems of automobiles or other vehicles include damping force control type hydraulic shock absorbers which are designed so that the level of damping force can be appropriately controlled in accordance with the road surface conditions, vehicle running conditions, etc. with a view to improving the ride quality and the steering stability.

In general, this type of hydraulic shock absorber includes a cylinder having a hydraulic fluid sealed therein. A piston, which has a piston rod connected thereto to constitute a piston assembly, is slidably fitted in the cylinder to divide the inside of the cylinder into two chambers. The piston assembly is provided with a main hydraulic fluid passage and a bypass passage, which provide communication between the two chambers in the cylinder. The main hydraulic fluid passage is provided with a damping force generating mechanism including an orifice and a disk valve. The bypass passage is provided with a damping force control valve for controlling the flow path area of the bypass passage.

When the bypass passage is opened through the damping force control valve, the flow resistance to the hydraulic fluid flowing between the two chambers in the cylinder is reduced, thereby reducing damping force. When the bypass passage is closed, the flow resistance between the two chambers is increased, thereby increasing damping force. Thus, damping force characteristics can be appropriately controlled by opening and closing the damping force control valve.

In the above-described damping force control type hydraulic shock absorber, in which damping force is controlled by changing the flow path area of the bypass passage, the damping force characteristics can be changed to a considerable extent in the low piston speed region because damping force depends on the restriction by the orifice in the hydraulic fluid passage. However, the damping force characteristics cannot greatly be changed in the intermediate and high piston speed regions because in these regions damping force depends on the degree of opening of the damping force generating mechanism (disk valve, etc.) in the main hydraulic fluid passage.

To solve the above-described problem, Japanese Patent Application Unexamined Publication (KOKAI) No. 62-220728, for example, discloses a damping force control type hydraulic shock absorber in which a pressure chamber (pilot chamber) is formed at the back of a disk valve serving as a damping force generating mechanism in a main hydraulic fluid passage common to the extension and contraction sides, and the pressure chamber is communicated with a cylinder chamber on the upstream side of the disk valve through a fixed orifice and also communicated with a cylinder chamber on the downstream side of the disk valve through a variable orifice (flow control valve).

According to the above damping force control type hydraulic shock absorber, the flow path area of the passage between the two chambers in the cylinder is controlled by opening and closing the variable orifice. Moreover, the valve opening initial pressure of the disk valve can be varied by changing the pressure in the pressure chamber by the pressure loss in the variable orifice. Thus, it is possible to control orifice characteristics (in which damping force is approximately proportional to the square of the piston speed) and valve characteristics (in which damping force is approximately proportional to the piston speed), and hence possible to widen the control range for damping force characteristics.

However, the above-described conventional damping force control type hydraulic shock absorber suffers from the following problems.

In the damping force control type hydraulic shock absorber disclosed in Japanese Patent Application Unexamined Publication (KOKAI) No. 62-220728, damping force is controlled by the flow rate control through the variable orifice. Therefore, damping force actually generated changes according to the piston speed. For this reason, when there is an abrupt input due to thrusting-up force applied to the vehicle from the road surface, for example, damping force increases sharply as the piston speed rises, and shock is transmitted to the vehicle body. This may cause the ride quality to be degraded. Moreover, the flow resistance of the variable orifice varies to a considerable extent according to the viscosity of the hydraulic fluid. Therefore, the effect of temperature changes on the damping force characteristics is unfavorably large. Accordingly, stable damping force characteristics cannot be obtained with the variable orifice.

Meanwhile, there is a semi-active suspension control system in which a damping force control type hydraulic shock absorber is combined with acceleration sensors, a controller, an actuator, etc. to automatically switch over damping force characteristics in real time in accordance with accelerations acting on the vehicle (vertical acceleration, transverse acceleration, longitudinal acceleration, etc.), vehicle running conditions, road surface conditions and so forth, thereby improving the ride quality and the steering stability. It is known that in the semi-active suspension control system, necessary damping force can be obtained rapidly by enabling a combination of different damping force characteristics of the hydraulic shock absorber to be set for the extension and contraction sides, which are different in magnitude of damping force (e.g. a combination of "hard" damping force characteristics for the extension side and "soft" damping force characteristics for the compression side, or vice versa), and thus it is possible to improve the ride quality and the steering stability efficiently and to lighten the load on the controller and the actuator.

SUMMARY OF THE INVENTION

In view of the above-described circumstances, an object of the present invention is to provide a damping force control type hydraulic shock absorber which has a wide damping force characteristic control range and is capable of directly controlling damping force independently of the piston speed with a minimal effect of temperature changes on the damping force characteristics, and which is also capable of appropriately absorbing an abrupt input and enables a combination of different damping force characteristics to be set for the extension and compression sides, which are different in magnitude of damping force.

To attain the above-described object, the present invention provides a damping force control type hydraulic shock absorber including a cylinder having a hydraulic fluid sealed therein. A piston is slidably fitted in the cylinder. A piston rod is connected at one end thereof to the piston. The other end of the piston rod extends to the outside of the cylinder. An extension main passage passes the hydraulic fluid in response to sliding movement of the piston during the extension stroke of the piston rod. An extension sub-passage is provided in parallel to the extension main passage. A compression main passage passes the hydraulic fluid in response to sliding movement of the piston during the compression stroke of the piston rod. A compression sub-passage is provided in parallel to the compression main passage. An extension pilot-type damping valve is provided in the extension main passage. A compression pilot-type damping valve is provided in the compression main passage. An extension fixed orifice is provided in the extension sub-passage. A compression fixed orifice is provided in the compression sub-passage. An extension valve seat is provided on the downstream side of the extension fixed orifice in the extension sub-passage. A compression valve seat is provided on the downstream side of the compression fixed orifice in the compression sub-passage to face the extension valve seat. A disk valve is placed between the extension valve seat and the compression valve seat so as to rest on or separate from these valve seats. The disk valve opens upon receiving the pressure in the extension sub-passage at one end thereof and also opens upon receiving the pressure in the compression sub-passage at the other end thereof. An actuator controls the valve opening pressures of the disk valve with respect to the extension valve seat and the compression valve seat. The pressure between the extension fixed orifice in the extension sub-passage and the disk valve is used as a pilot pressure of the extension pilot-type damping valve. The pressure between the compression fixed orifice in the compression sub-passage and the disk valve is used as a pilot pressure of the compression pilot-type damping valve.

With the above-described arrangement, by controlling the valve opening pressures of the disk valve with respect to the compression and extension valve seats with thrust from the actuator, extension- and compression-side damping forces are directly controlled. Moreover, the pilot pressures are changed by the pressure loss due to the disk valve to control the valve opening pressures of the extension and compression pilot-type damping valves. At this time, a sharp increase in pressure of the hydraulic fluid is relieved by deflection of the disk valve. In addition, because the disk valve is placed between the extension valve seat and the compression valve seat, it is possible to simultaneously select different damping force characteristics for the extension and compression sides, which are different in magnitude of damping force.

DETAILED DESCRIPTION OF THE INVENTION

One embodiment of the present invention will be described below in detail with reference to the accompanying drawings.

Figure 1:
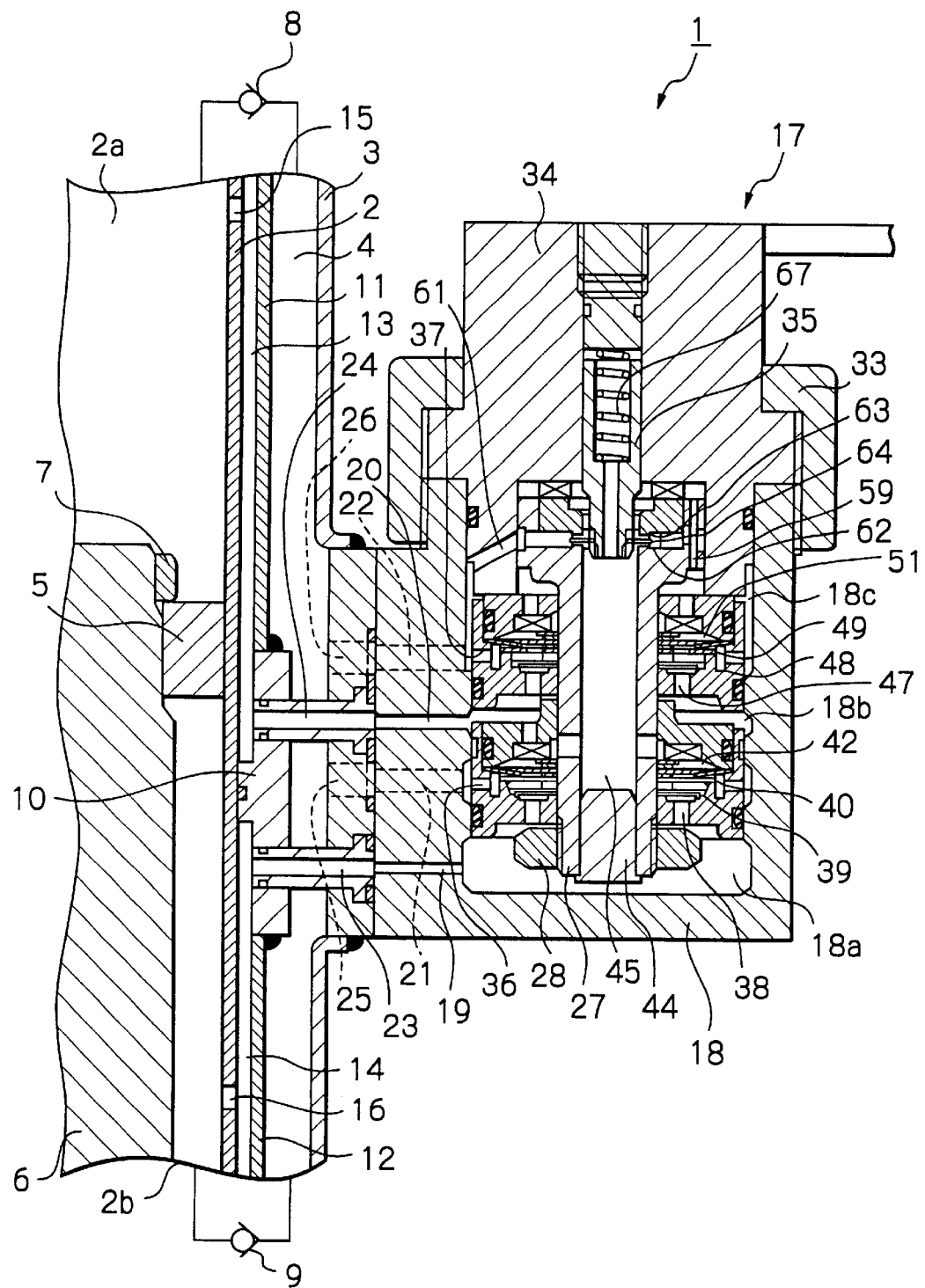
FIG. 1 is a vertical sectional view showing an essential part of a damping force control type hydraulic shock absorber according to one embodiment of the present invention.
Figure 2:
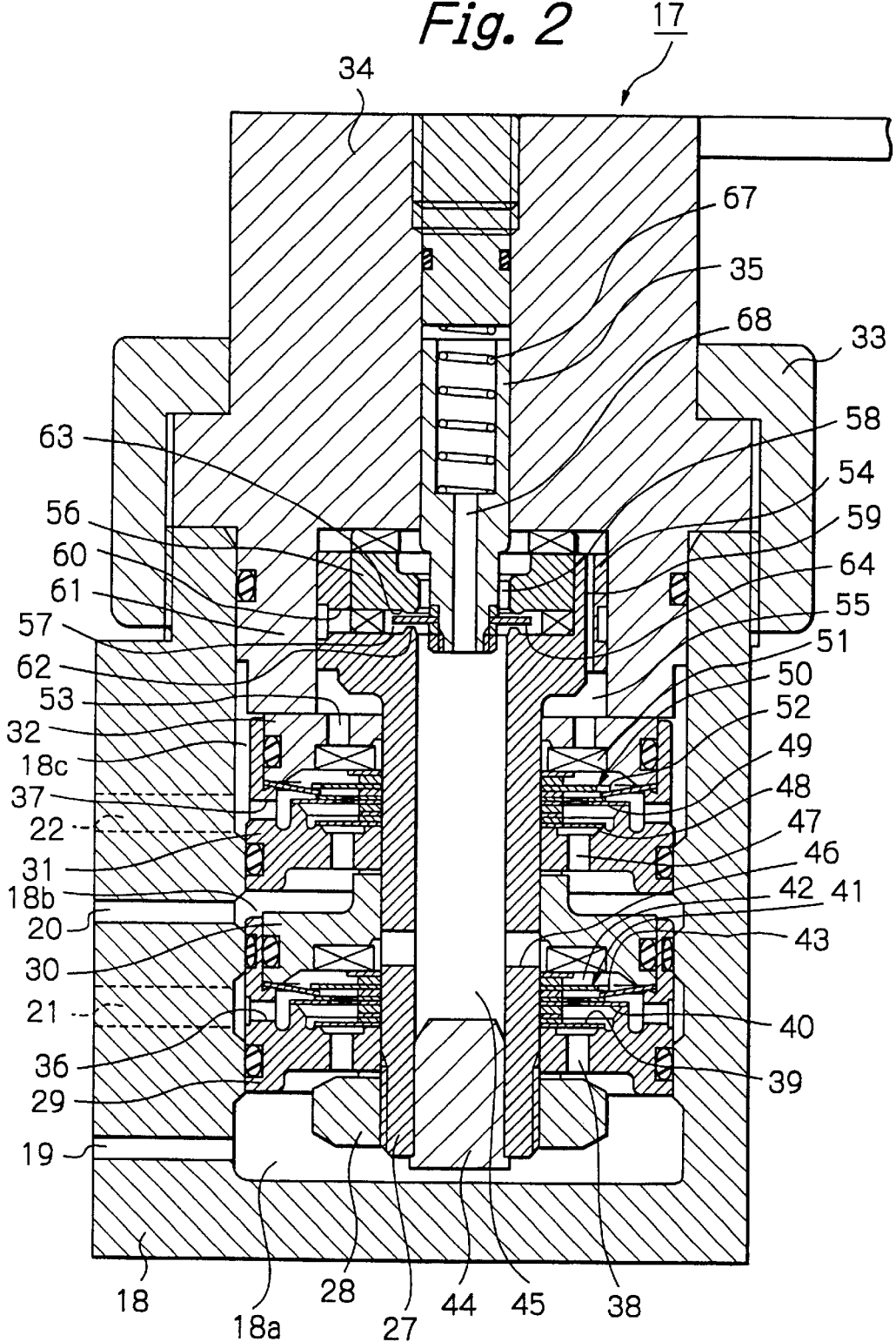
FIG. 2 is an enlarged view of a damping force generating mechanism in the apparatus shown in FIG. 1.

As shown in FIGS. 1 and 2, a damping force control type hydraulic shock absorber 1 according to this embodiment has a double-cylinder structure comprising a cylinder 2 and an outer cylinder 3 provided outside the cylinder 2. An annular reservoir 4 is formed between the cylinder 2 and the outer cylinder 3. A piston 5 is slidably fitted in the cylinder 2. The piston 5 divides the inside of the cylinder 2 into two chambers, i.e. a cylinder upper chamber 2a and a cylinder lower chamber 2b. The piston 5 is connected with one end of a piston rod 6 by a nut 7. The other end portion of the piston rod 6 extends through the cylinder lower chamber 2b and further through a rod guide (not shown) and an oil seal (not shown), which are fitted to the lower end portion of the double-cylinder structure comprising the cylinder 2 and the outer cylinder 3, and projects to the outside of the cylinder 2.

The cylinder upper and lower chambers 2a and 2b are communicated with the reservoir 4 through respective check valves 8 and 9. The check valve 8 allows hydraulic fluid to flow in only one direction from the reservoir 4 to the cylinder upper chamber 2a. The check valve 9 allows hydraulic fluid to flow in only one direction from the reservoir 4 to the cylinder lower chamber 2b. The cylinder 2 has a hydraulic fluid sealed therein, and the reservoir 4 has the hydraulic fluid sealed therein, together with a gas.

An approximately cylindrical passage member 10 is fitted over the outer periphery of the cylinder 2. An upper tube 11 is fitted over the outer periphery of an upper portion of the cylinder 2 and connected to the upper end of the passage member 10. A lower tube 12 is fitted over the outer periphery of a lower portion of the cylinder 2 and connected to the lower end of the passage member 10. An annular hydraulic fluid passage 13 is formed between the cylinder 2 and the upper tube 11. An annular hydraulic fluid passage 14 is formed between the cylinder 2 and the lower tube 12. The annular hydraulic fluid passages 13 and 14 are communicated with the cylinder upper and lower chambers 2a and 2b through hydraulic fluid passages 15 and 16, respectively, which are provided in the side wall of the cylinder 2. A damping force generating mechanism 17 is secured to a side portion of the outer cylinder 3. The damping force generating mechanism 17 has a casing 18. The casing 18 is provided with four connecting ports 19, 20, 21 and 22 connected to the annular hydraulic fluid passages 14 and 13 and the reservoir 4 through connecting pipes 23 and 24 and connecting openings 25 and 26, respectively.

As shown in FIG. 2, the damping force generating mechanism 17 has an approximately cylindrical casing 18, one end of which is closed. Four valve bodies 29, 30, 31 and 32 are fitted in the casing 18. The valve bodies 29, 30, 31 and 32 are pierced with a sleeve 27 and united together by a nut 28. A proportional solenoid actuator 34 (hereinafter referred to as "actuator 34") is attached to the open end of the casing 18 by using a retainer ring 33. The valve bodies 30 and 32 are fitted into respective cylindrical portions of the valve bodies 29 and 31. The sleeve 27 is connected to the actuator 34. The distal end portion of a plunger 35 of the actuator 34 is inserted into the sleeve 27.

The inside of the casing 18 is divided by the two valve bodies 29 and 31 into three hydraulic fluid chambers 18a, 18b and 18c, which are communicated with the connecting ports 19, 20 and 22, respectively. Hydraulic fluid passages 36 and 37 are provided in the respective side walls of the cylindrical portions of the valve bodies 29 and 31. The hydraulic fluid passage 36 is communicated with the connecting port 21. The hydraulic fluid passage 37 is communicated with the connecting port 22 through the hydraulic fluid chamber 18*c*.

The valve body 29 is provided with a hydraulic fluid passage 38 for communication between the hydraulic fluid chamber 18*a* and the inside of the cylindrical portion of the valve body 29. The hydraulic fluid passage 38 is provided with a sub-valve 39 (upstream-side disk valve) and a main valve 40 (downstream-side disk valve), which is an extension pilot-type damping valve. The sub-valve 39 and the main valve 40 are each adapted to deflect to open upon receiving the pressure of the hydraulic fluid in the hydraulic fluid chamber 18*a* and to generate damping force according to the degree of opening thereof. A plurality of disk-shaped seal members 41 are stacked on the main valve 40. The seal members 41 and the valve body 30 form a pilot chamber 42 at the back of the main valve 40. The pressure in the pilot chamber 42 acts in the direction for closing the main valve 40. It should be noted that the valve opening pressure of the sub-valve 39 is set sufficiently lower than the valve opening pressure of the main valve 40. The pilot chamber 42 is communicated with the hydraulic fluid passage 38 through a fixed orifice 43 (extension fixed orifice) provided in the seal members 41. The sleeve 27 has a plug 44 fitted into the distal end thereof to form a hydraulic fluid passage 45 therein. The hydraulic fluid passage 45 and the pilot chamber 42 are communicated with each other through a hydraulic fluid passage 46 provided in the side wall of the sleeve 27.

The valve body 31 is provided with a hydraulic fluid passage 47 for communication between the hydraulic fluid chamber 18*b* and the inside of the cylindrical portion of the valve body 31. The hydraulic fluid passage 47 is provided with a sub-valve 48 (upstream-side disk valve) and a main valve 49 (downstream-side disk valve), which is a compression pilot-type damping valve. The sub-valve 48 and the main valve 49 are each adapted to deflect to open upon receiving the pressure of the hydraulic fluid in the hydraulic fluid chamber 18*b* and to generate damping force according to the degree of opening thereof. A plurality of disk-shaped seal members 50 are stacked on the main valve 49. The seal members 50 and the valve body 32 form a pilot chamber 51 at the back of the main valve 49. The pressure in the pilot chamber 51 acts in the direction for closing the main valve 49. It should be noted that the valve opening pressure of the sub-valve 48 is set sufficiently lower than the valve opening pressure of the main valve 49. The pilot chamber 51 is communicated with the hydraulic fluid passage 47 through a fixed orifice 52 (compression fixed orifice) provided in the seal members 50. The pilot chamber 51 is communicated with a hydraulic fluid chamber 55, which is formed between the valve body 32 and a large-diameter portion 54 formed at the proximal end of the sleeve 27, through a hydraulic fluid passage 53 provided in the valve body 32.

An annular seat member 56 is provided between the actuator 34 and the proximal end portion of the sleeve 27 that is connected to the actuator 34. A circular hydraulic fluid chamber 57 is formed between the seat member 56 and the proximal end surface of the large-diameter portion 54. The hydraulic fluid chamber 57 communicates with the hydraulic fluid passage 45. The plunger 35 is inserted into the seat member 56 to form an annular hydraulic fluid passage 58 between the plunger 35 and the seat member 56. The annular hydraulic fluid passage 58 communicates with the hydraulic fluid chamber 57. The annular hydraulic fluid passage 58 is communicated with the hydraulic fluid chamber 55 through a hydraulic fluid passage 59 provided axially in the large-diameter portion 54. The circular hydraulic fluid chamber 57 is communicated with the hydraulic fluid chamber 18*c* through a hydraulic fluid passage 60 provided radially in the large-diameter portion 54 and through a hydraulic fluid passage 61 provided in the casing of the actuator 34.

Figure 3:
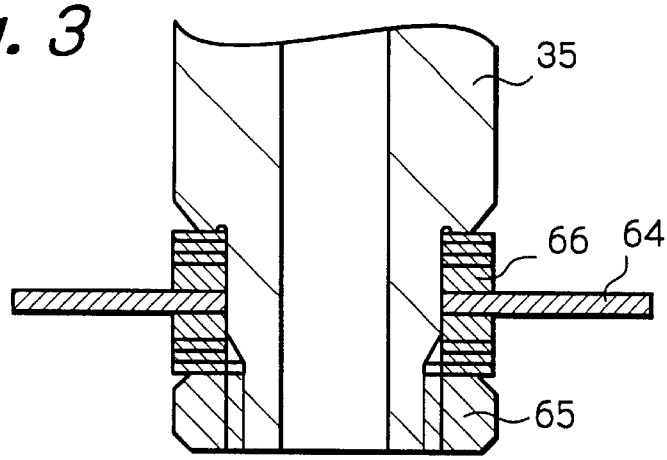
FIG. 3 is an enlarged view of a disk valve in the apparatus shown in FIG. 1.

An annular valve seat 62 (extension valve seat) projects from the sleeve 27 around the opening of the hydraulic fluid passage 45 at the proximal end of the sleeve 27. An annular valve seat 63 (compression valve seat) projects from the seat member 56 around the opening of the annular hydraulic fluid passage 58 so as to face the valve seat 62. A flexible disk valve 64 is secured to the distal end portion of the plunger 35 extending through the valve seats 62 and 63. The disk valve 64 faces both the valve seat 62 and the valve seat 63. As shown in FIG. 3, the disk valve 64 is secured to the distal end portion of the plunger 35 by using a nut 65 and a plurality of spacers 66. The plunger 35 is urged toward the sleeve 27 by spring force of a return spring 67. The plunger 35 is provided with a hydraulic fluid passage 68 to keep a balance between the pressures of hydraulic fluid acting on both ends of the plunger 35.

Normally, the disk valve 64 is pressed on the valve seat 62 by the spring force of the return spring 67. When the actuator 34 is energized, thrust is generated according to the electric current supplied to the actuator 34, thus causing the plunger 35 to retract against the spring force of the return spring 67. Balance between the thrust and the spring force of the return spring 67 determines the valve opening pressures of the disk valve 64 with respect to the valve seat 62 and the valve seat 63, i.e. with respect to the hydraulic fluid passage 45 and the annular hydraulic fluid passage 58. Therefore, the valve opening pressures of the disk valve 64 can be controlled by varying the electric current supplied to the actuator 34.

In the above-described arrangement, an extension main passage is formed by the hydraulic fluid passage 16, the annular hydraulic fluid passage 14, the connecting pipe 23, the connecting port 19, the hydraulic fluid chamber 18*a*, the hydraulic fluid passage 38, the connecting port 21 and the connecting opening 25. An extension sub-passage is formed by the fixed orifice 43, the pilot chamber 42, the hydraulic fluid passages 46 and 45, the hydraulic fluid chamber 57, the hydraulic fluid passages 60 and 61, the hydraulic fluid chamber 18*c*, the connecting port 22 and the connecting opening 26. A compression main passage is formed by the hydraulic fluid passage 15, the annular hydraulic fluid passage 13, the connecting pipe 24, the connecting port 20, the hydraulic fluid chamber 18*b*, the hydraulic fluid passages 47 and 37, the connecting port 22 and the connecting opening 26. A compression sub-passage is formed by the fixed orifice 52, the pilot chamber 51, the hydraulic fluid passage 53, the hydraulic fluid chamber 55, the hydraulic fluid passage 59, the annular hydraulic fluid passage 58, the hydraulic fluid chamber 57, the hydraulic fluid passages 60 and 61, the hydraulic fluid chamber 18*c*, the connecting port 22 and the connecting opening 26.

Figure 6:
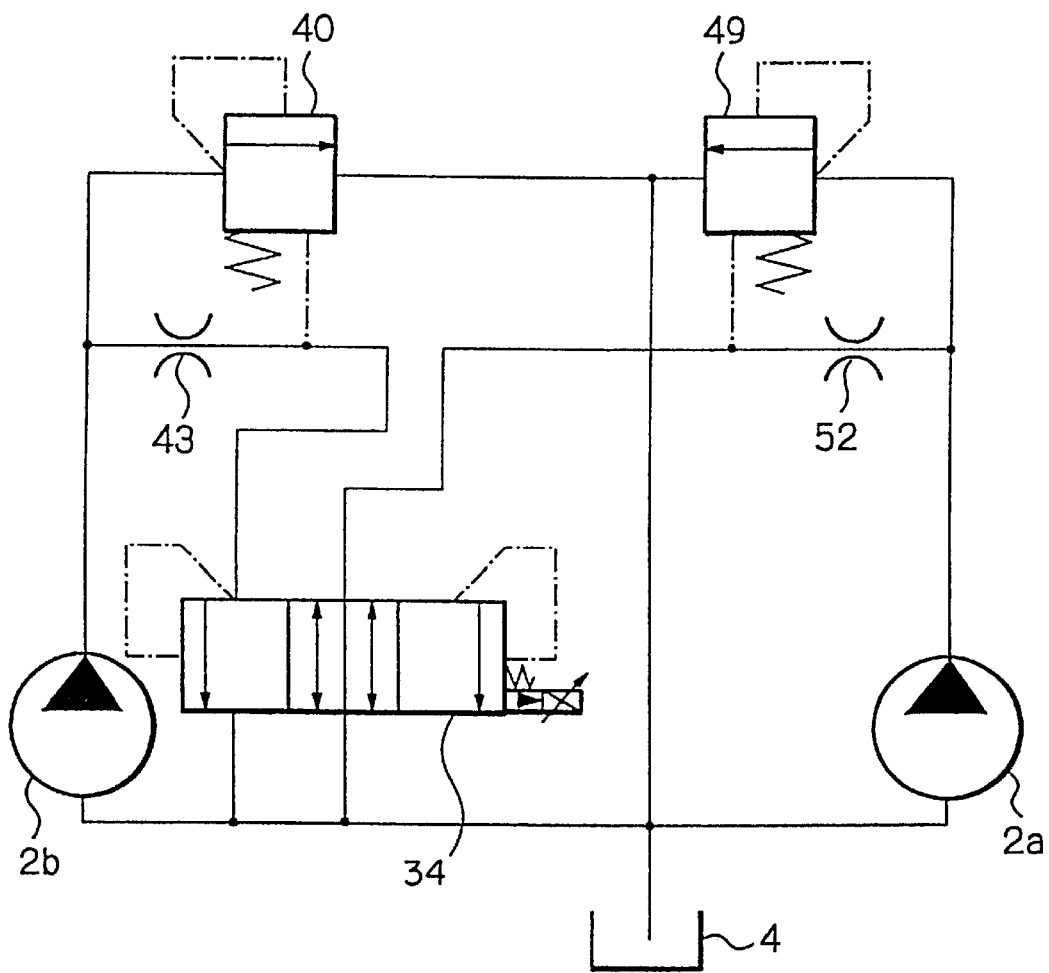
FIG. 6 is a hydraulic circuit diagram schematically showing the arrangement of the apparatus shown in FIG. 1.

FIG. 6 is a hydraulic circuit diagram of the damping force control type hydraulic shock absorber 1. It should be noted that FIG. 6 schematically shows the connection relationship between the principal elements of the damping force control type hydraulic shock absorber 1, and in FIG. 6, the corresponding elements are denoted by the same reference numerals. In FIG. 6, the sub-valves 39 and 48 are omitted.

The operation of this embodiment will be described below.

During the extension stroke of the piston rod 6, as the piston 5 moves, the check valve 9 is closed, and the hydraulic fluid in the cylinder lower chamber 2b is pressurized. Before the main valve 40 opens, the hydraulic fluid in the cylinder lower chamber 2b flows through the hydraulic fluid passage 16, the annular hydraulic fluid passage 14 and the connecting pipe 23 to the connecting port 19 of the damping force generating mechanism 17 and further flows through the hydraulic fluid chamber 18a and the hydraulic fluid passage 38, causing the sub-valve 39 to open. Then, the hydraulic fluid flows through the fixed orifice 43, the pilot chamber 42, the hydraulic fluid passage 46 and the hydraulic fluid passage 45, causing the disk valve 64 to lift from the valve seat 62. Then, the hydraulic fluid flows through the hydraulic fluid chamber 57, the hydraulic fluid passage 60, the hydraulic fluid passage 61, the hydraulic fluid chamber 18c, the connecting port 22 and the connecting opening 26 to the reservoir 4. When the pressure in the cylinder lower chamber 2b reaches the valve opening pressure of the main valve 40, the main valve 40 opens to allow the hydraulic fluid to flow from the sub-valve 39 to the reservoir 4 through the hydraulic fluid passage 36, the connecting port 21 and the connecting opening 25. It should be noted that the hydraulic fluid in the reservoir 4 opens the check valve 8 to flow into the cylinder upper chamber 2a.

Thus, during the extension stroke, when the piston speed is low and before the main valve 40 opens, damping force is generated according to the flow path area determined by the sub-valve 39, the fixed orifice 43 and the disk valve 64. As the piston speed increases, the pressure in the cylinder lower chamber 2b rises, and eventually the main valve 40 opens. After the main valve 40 has opened, damping force is generated according to the degree of opening of the main valve 40. By controlling the valve opening pressure of the disk valve 64 with respect to the valve seat 62 according to the electric current supplied to the actuator 34, damping force generated before the main valve 40 opens can be directly controlled independently of the piston speed. Moreover, the pressure in the pilot chamber 42 is changed by the pressure loss due to the disk valve 64. Thus, the valve opening pressure of the main valve 40 (damping force in the high piston speed region) can also be controlled.

Figure 7:
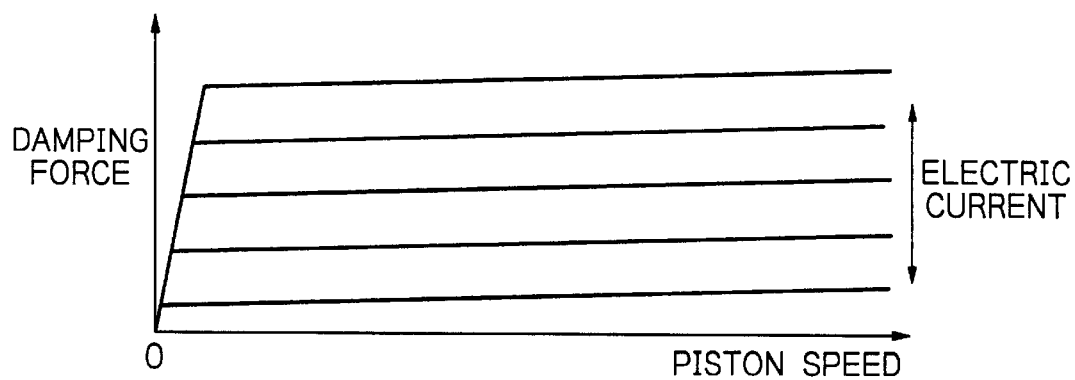
FIG. 7 is a graph showing the relationship between damping force and the electric current supplied to an actuator in the apparatus shown in FIG. 1.

FIG. 7 shows the relationship between damping force and the electric current supplied to the actuator 34.

During the compression stroke of the piston rod 6, as the piston 5 moves, the check valve 8 is closed, and the pressure in the cylinder upper chamber 2a is pressurized. Before the main valve 49 opens, the hydraulic fluid flows through the hydraulic fluid passage 15, the annular hydraulic fluid passage 13 and the connecting pipe 24 to the connecting port 20 of the damping force generating mechanism 17 and further flows through the hydraulic fluid chamber 18b and the hydraulic fluid passage 47, causing the sub-valve 48 to open. Then, the hydraulic fluid flows through the fixed orifice 52, the pilot chamber 51, the hydraulic fluid passage 53, the hydraulic fluid chamber 55, the hydraulic fluid passage 59 and the annular hydraulic fluid passage 58, causing the disk valve 64 to lift from the valve seat 63. Then, the hydraulic fluid flows through the hydraulic fluid chamber 57, the hydraulic fluid passage 60, the hydraulic fluid passage 61, the hydraulic fluid chamber 18c, the connecting port 22 and the connecting opening 26 to the reservoir 4. When the pressure in the cylinder upper chamber 2a reaches the valve opening pressure of the main valve 49, the main valve 49 opens to allow the hydraulic fluid to flow from the sub-valve 48 to the reservoir 4 through the hydraulic fluid passage 37, the hydraulic fluid chamber 18c, the connecting port 22 and the connecting opening 26. It should be noted that the hydraulic fluid in the reservoir 4 opens the check valve 9 to flow into the cylinder lower chamber 2b.

Thus, during the compression stroke, when the piston speed is low and before the main valve 49 opens, damping force is generated according to the flow path area determined by the sub-valve 48, the fixed orifice 52 and the disk valve 64. As the piston speed increases, the pressure in the cylinder upper chamber 2a rises, and eventually the main valve 49 opens. After the main valve 49 has opened, damping force is generated according to the degree of opening of the main valve 49. By controlling the valve opening pressure of the disk valve 64 with respect to the valve seat 63 according to the electric current supplied to the actuator 34, damping force generated before the main valve 49 opens can be directly controlled independently of the piston speed. Moreover, the pressure in the pilot chamber 51 is changed by the pressure loss due to the disk valve 64. Thus, the valve opening pressure of the main valve 49 (damping force in the high piston speed region) can also be controlled. Thus, for the compression side also, it is possible to obtain damping force characteristics such as those shown in FIG. 7.

Figure 4:
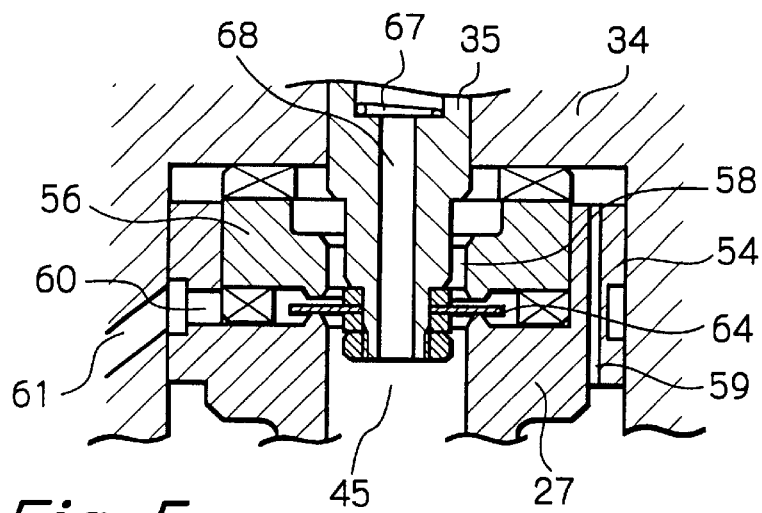
FIG. 4 is a diagram showing the disk valve as pressed on an extension valve seat in the apparatus shown in FIG. 1.
Figure 5:
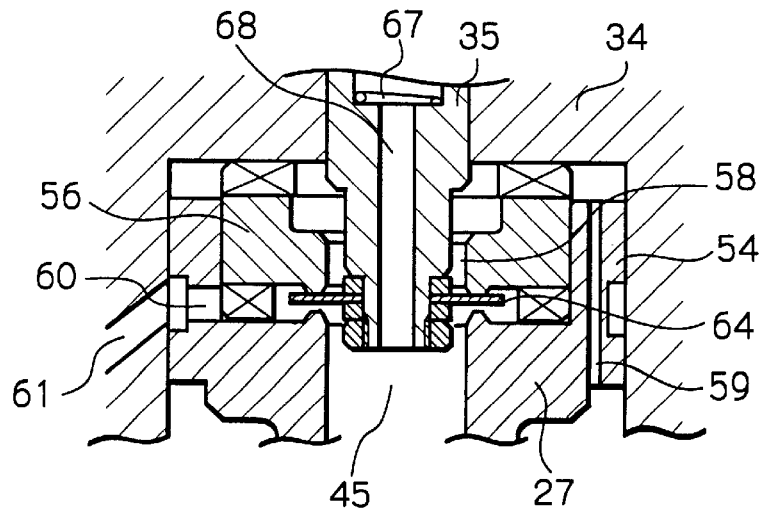
FIG. 5 is a diagram showing the disk valve as pressed on a compression valve seat in the apparatus shown in FIG. 1.
Figure 8:
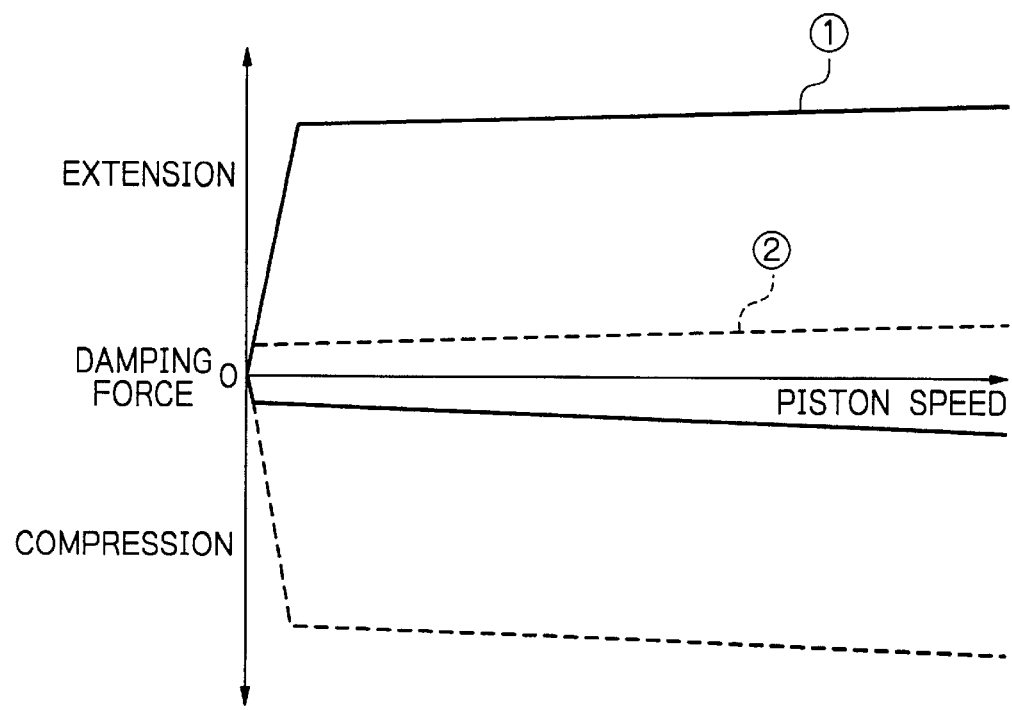
FIG. 8 is a graph showing the relationship between extension- and compression-side damping force characteristics of the apparatus shown in FIG. 1.

Regarding the valve opening pressures of the disk valve 64 with respect to the valve seat 62 and the valve seat 63, when one of them is increased, the other decreases. Therefore, it is possible to set a combination of different damping force characteristics for the extension and compression sides, which are different in magnitude of damping force (for example, "hard" damping force characteristics for the extension side and "soft" damping force characteristics for the compression side, or vice versa), and hence possible to obtain damping force characteristics suitable for the above-described semi-active suspension control system. For example, if, as shown in FIG. 4, the electric current supplied to the actuator 34 is reduced to press the disk valve 64 on the valve seat 62 to thereby open the flow path on the valve seat 63 side, it is possible to obtain a combination of "hard" damping force characteristics for the extension side and "soft" damping force characteristics for the compression side. Damping force characteristics obtained in this case are shown by ① in FIG. 8. If, as shown in FIG. 5, the electric current supplied to the actuator 34 is increased to press the disk valve 64 on the valve seat 63 to thereby open the flow path on the valve seat 62 side, it is possible to obtain a combination of "soft" damping force characteristics for the extension side and "hard" damping force characteristics for the compression side. Damping force characteristics obtained in this case are shown by ② in FIG. 8. It should be noted that if the electric current supplied to the actuator 34 is controlled so as to position the disk valve 64 at the middle between the valve seat 62 and the valve seat 63 to thereby open both the flow paths associated with the valve seats 62 and 63, it is possible to obtain "soft" damping force characteristics for both the extension and contraction sides.

Because damping force is controlled with the disk valve 64, which is a pressure control valve, the effect of hydraulic fluid viscosity changes on the flow resistance is smaller than in the case of the conventional system using a variable orifice (flow control valve). Therefore, it is possible to obtain damping force stable to temperature changes. When the pressure in the pilot chambers 42 and 51 rises sharply in response to an abrupt input due to thrusting-up force applied to the vehicle from the road surface, for example, the disk valve 64 deflects to relieve the pressure appropriately.

Therefore, it is possible to suppress a sharp rise in damping force and hence possible to improve the ride quality of the vehicle. In addition, even when the disk valve 64 is moved rapidly between the valve seats 62 and 63 by rapidly varying the electric current supplied to the actuator 34, shock can be absorbed by the flexibility of the disk valve 64. Therefore, the occurrence of chattering or the like is prevented, and thus stable damping force can be obtained.

As has been detailed above, in the damping force control type hydraulic shock absorber according to the present invention, the valve opening pressure of the disk valve positioned between the extension valve seat and the compression valve seat is controlled with the actuator. Consequently, extension-side damping force and compression-side damping force can be controlled directly. Moreover, the pilot pressures are changed by the pressure loss due to the disk valve. Thus, the valve opening pressures of the extension and compression pilot-type damping valves can be controlled. At this time, a sharp increase in pressure of the hydraulic fluid can be relieved by deflection of the disk valve. Therefore, it is possible to suppress a sharp rise in damping force. Because the disk valve is positioned between the extension valve seat and the compression valve seat, it is possible to simultaneously select different damping force characteristics for the extension and compression sides, which are different in magnitude of damping force, and hence possible to obtain damping force characteristics suitable for the semi-active suspension control system. Even when the disk valve is moved rapidly between the extension valve seat and the compression valve seat, shock can be absorbed by the flexibility of the disk valve. Therefore, the occurrence of chattering or the like is prevented, and thus stable damping force can be obtained.

What is claimed is:

1. A damping force control type hydraulic shock absorber comprising:
   a cylinder having a hydraulic fluid sealed therein;
   a piston slidably fitted in said cylinder and dividing said cylinder into two cylinder chambers;
   a piston rod connected at one end thereof to said piston, the other end of said piston rod extending to an outside of said cylinder; and
   a damping force generating mechanism including,
      an extension main passage for passing the hydraulic fluid in response to sliding movement of said piston during an extension stroke of said piston rod;
      an extension sub-passage provided in parallel to said extension main passage;
      a compression main passage for passing the hydraulic fluid in response to sliding movement of said piston during a compression stroke of said piston rod;
      a compression sub-passage provided in parallel to said compression main passage;
      an extension pilot-type damping valve provided in said extension main passage;
      a compression pilot-type damping valve provided in said compression main passage;
      an extension fixed orifice provided in said extension sub-passage;
      a compression fixed orifice provided in said compression sub-passage;
      an extension valve seat provided on a downstream side of said extension fixed orifice in said extension sub-passage;
      a compression valve seat provided on a downstream side of said compression fixed orifice in said compression sub-passage to face said extension valve seat;
      a disk valve placed between said extension valve seat and said compression valve seat so as to rest on or separate from these valve seats, said disk valve being adapted to open upon receiving a pressure in said extension sub-passage at one end thereof and to open upon receiving a pressure in said compression sub-passage at the other end thereof; and
      an actuator for controlling valve opening pressures of said disk valve with respect to said extension valve seat and said compression valve seat;
      wherein a pressure between said extension fixed orifice in said extension sub-passage and said disk valve is used as a pilot pressure of said extension pilot-type damping valve, and a pressure between said compression fixed orifice in said compression sub-passage and said disk valve is used as a pilot pressure of said compression pilot-type damping valve.

2. A damping force control type hydraulic shock absorber according to claim 1, wherein said damping force generating mechanism includes:
   a casing provided outside said cylinder;
   a sleeve fixed in said casing, said extension and compression pilot-type damping valves being fixed to said sleeve, said sleeve having an axial bore having one end closed and defining a hydraulic fluid passage in the sleeve,
   wherein said extension and compression valve seats are formed in a place along said hydraulic fluid passage so that said disk valve divides said hydraulic fluid passage into first and second sections so as to receive the fluid pressures in the first and second sections on the opposite sides thereof.

3. A damping force control type hydraulic shock absorber according to claim 2, wherein said damping force generating mechanism further includes a plunger connected to said disk valve and biased by a spring toward one of said extension and compression valve seats and an actuator which, when energized, moves the plunger against the effect of said spring.

4. A damping force control type hydraulic shock absorber according to claim 2, wherein said cylinder also has a reservoir and said damping force generating mechanism includes valve bodies supported by said sleeve so as to divide the interior of said casing into a first chamber on one side of said extension pilot-type damping valve, a second chamber between said extension and compression pilot-type damping valves and a third chamber downstream of said compression pilot-type damping valve,
   said extension main passage extending from one of said cylinder chambers through said first chamber and said extension pilot-type damping valve to said reservoir and
   said compression main passage extending from the other of said cylinder chambers through said second chamber and said compression pilot-type damping valve to said reservoir.

5. A damping force control type hydraulic shock absorber according to claim 4,
   wherein said valve bodies define an extension pilot chamber on the side of said extension pilot-type damping valve remote from said first chamber and said sleeve has a port communicated with said extension pilot chamber so that said pilot pressure of the extension pilot-type damping valve is established in said extension pilot chamber through said first section of the hydraulic fluid passage and, wherein said valve bodies also define a compression pilot chamber on the side of said compression pilot-type damping valve remote from said second chamber and a path is provided to connect the compression pilot chamber to said second section of the hydraulic fluid passage so that said pilot pressure of the compression pilot-type damping valve is established in said compression pilot chamber through said second section of the hydraulic fluid passage.

6. A damping force control type hydraulic shock absorber according to claim 5, wherein the area between said extension and compression valve seats is communicated with said reservoir.

7. A damping force control type hydraulic shock absorber according to claim 6, wherein said third chamber is communicated with said reservoir and said area between said extension and compression valve seats is connected to said third chamber.

* * * * *